April 8, 1969
C. L. BLAIR
3,436,995
TAIL STOCK STRUCTURE
Filed April 21, 1967
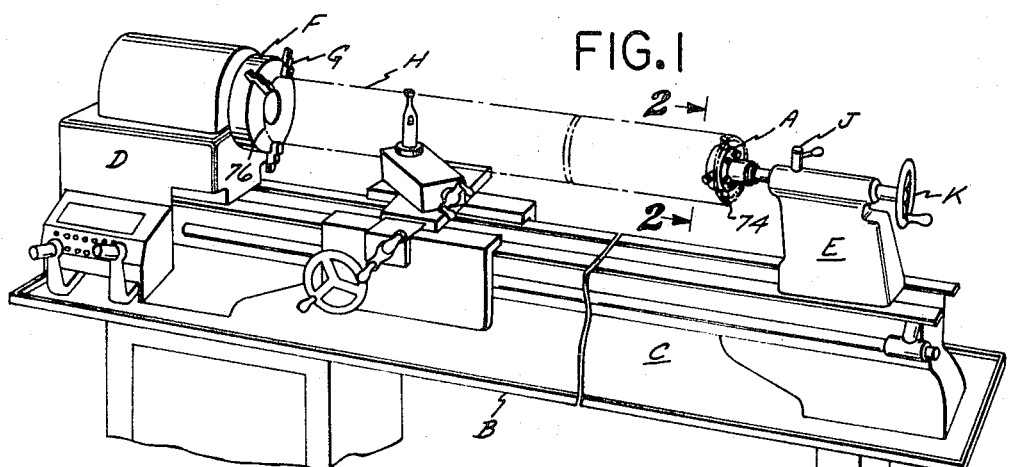
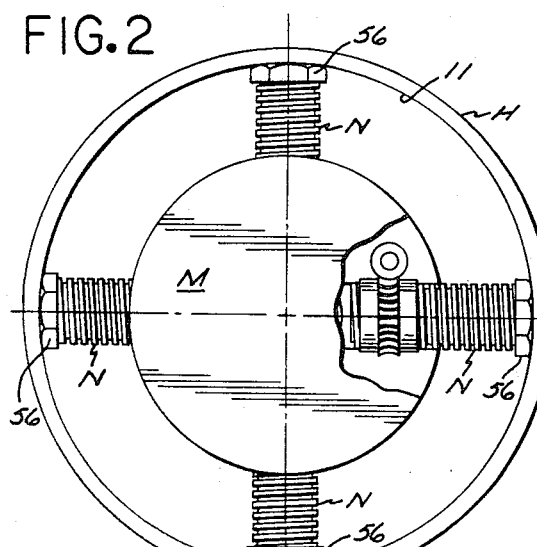
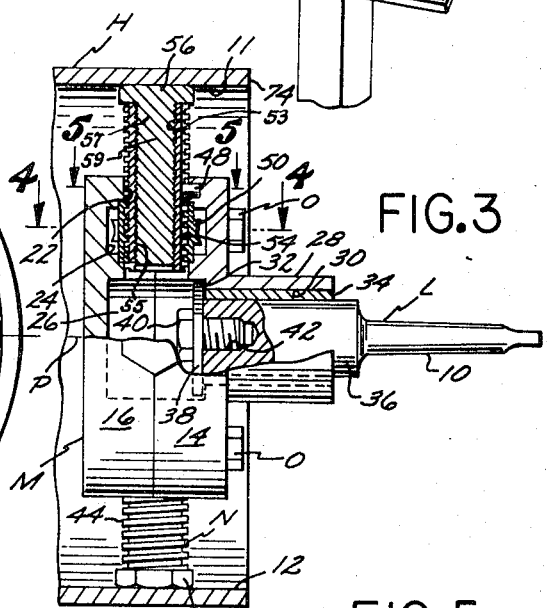
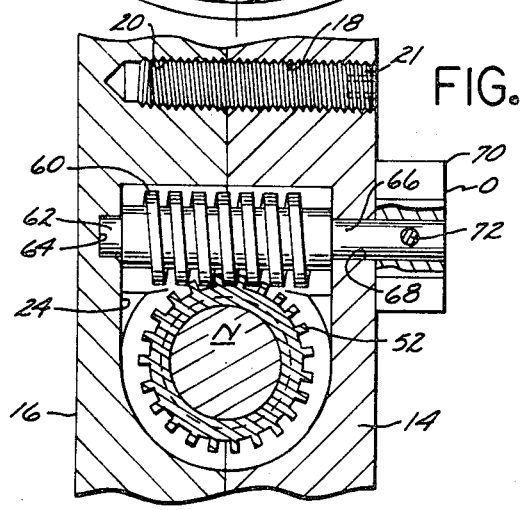
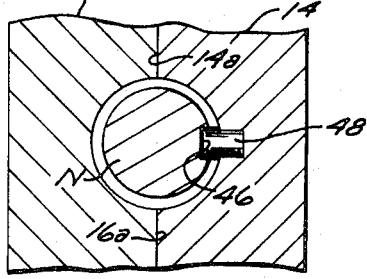
INVENTOR.
CLIFFORD L. BLAIR
BY William C. Bobock
ATTORNEY

United States Patent Office 3,436,995
Patented Apr. 8, 1969

3,436,995
TAIL STOCK STRUCTURE
Clifford L. Blair, Santa Susana, Calif.
(354 S. Evergreen Drive, Independence, Oreg. 97351)
Filed Apr. 21, 1967, Ser. No. 632,737
Int. Cl. B23b 31/40, 5/22
U.S. Cl. 82—38          9 Claims

ABSTRACT OF THE DISCLOSURE

A tail stock structure that may be removably mounted on a conventional lathe tail stock to so support a tubular member that it rotates on the longitudinal axis of the bore defined in the member, which structure permits mechanical operations to be carried out on the interior of the tubular member outwardly that portion of the tubular member engaged by the tail stock structure. Such mechanical operations may constitute the formation of a circumferentially extending recess or the like on the interior surface of the tubular member.

BACKGROUND OF THE INVENTION

Field of the invention

A tail stock structure capable of being removably mounted on a conventional lathe tail stock, to permit an interior end surface of a tubular member to be engaged, with the engaged member being adapted to be so disposed on the lathe that the member as a whole may be rotated on the longitudinal axis of the bore extending through the member.

Description of the prior art

In the past, numerous tail stocks and accessories for use therewith have been evolved and used in rotatably supporting workpieces, but no one of these prior devices has been capable of so supporting an end portion of a tubular member that it may be rotated on the longitudinal axis of the bore extending therethrough to permit formation of circumferentially extending grooves of uniform detph on the interior surface of the tubular member. By means of the tail stock structure illustrated in the accompanying drawing and as hereinafter described, the applicant has provided a device of simple, mechanical structure that permits the rotatable support of a tubular member on a lathe in a position to rotate on the longitudinal axis of the bore extending therethrough, as well as permit performance of mechanical operations on the interior surface of the tubular member, outwardly from where the present invention engages the tubular member.

Summary of the invention

A tail stock structure that may be removably mounted on a conventional lathe tail stock, which structure includes a spindle-supported rotatable body from which a number of circumferentially spaced radially positioned members project that may pressure contact the interior surface of a lathe-supported tubular member to cause the same to rotate on the longitudinal axis of the bore extending therethrough. The tail stock structure is capable of being disposed inwardly a substantial distance from an extremity of the tubular member to permit cutting or mechanical operations to be performed on an outer interior surface of the member.

A major object of the present invention is to provide a tail stock structure that may be fabricated from standard, commercially available materials that includes a plurality of circumferentially spaced, radially adjustable members capable of pressure-contacting the interior surface of the tubular member to so dispose a tubular member on a lathe that the member rotates on the longitudinal axis of the bore extending therethrough.

Another object of the invention is to supply a tail stock structure that can engage the interior surface of a tubular member a substantial distance from one end thereof, and when so engaged, the tubular member is susceptible to having grooves or other circumferentially extending configurations formed on the interior surface portion thereof outwardly from that part of the tubular member engaged by the tail stock structure.

A still further object of the tail stock structure is to provide a device that is simple and easy to mount on a conventional tail stock, requires a minimum of experience in using the same to achieve satisfactory results, and one which, due to its simplicity of structure and nature of the material defining the same, can be retailed at a sufficiently low price as to encourage the widespread use thereof.

Brief description of the drawing

FIGURE 1 is a perspective view of a conventional lathe with the tail stock structure removably mounted on the lathe tail stock;

FIGURE 2 is an end elevational view of the structure, with a portion thereof cut away to show the interior thereof, which view is taken on line 2—2 of FIGURE 1;

FIGURE 3 is a combined side elevational and longitudinal cross-sectional view of the structure illustrating the interior thereof;

FIGURE 4 is a longitudinal cross-sectional view of the structure, taken on the line 4—4 of FIGURE 3; and FIGURE 5 is a second longitudinal cross-sectional view of the structure, taken on line 5—5 of FIGURE 3.

Description of the preferred embodiment

With further reference to the drawing, it will be seen in FIGURE 1 that the tail stock structure A is positioned to be used on a lathe B including a bed C having a head stock D and tail stock E mounted on opposite ends thereof. The head stock D supports a power-driven face plate F provided with a number of radially movable jaws G that may engage a first end of an elongate tubular member H. A second end of member H, as best seen in FIGURE 1, is supported for rotary movement by the tail stock structure A. The tail stock E, as is conventional with such equipment, has a longitudinally extending opening (not shown) in which a dead center or other workpiece-supporting member may be removably inserted. The dead center or other workpiece-supporting member is held at a fixed position on the tail stock E by use of a clamp handle J, and the member so held is longitudinally movable relative to the dead center by use of a rotatable adjusting handle K.

The tail stock structure A, best shown in FIGURE 3, includes a spindle L, a portion 10 of which may be removably inserted in the previously mentioned opening in the tail stock E and held in a fixed position therein by use of the clamp handle J. The spindle L rotatably supports a rigid body M having a number of circumferentially spaced, radially extending members N supported therein, with each of these members being independently movable relative to the balance thereof by adjustable means O (FIGURES 3 and 4).

By properly adjusting the members N, the end of the tubular member H supported by the tail stock structure A may be so disposed relative to the face plate F that the tubular member rotates on a longitudinal axis P of the bore 11 extending through the tubular member. When the tubular member H is so supported, rings, or the like, can be formed on the interior surface 12 of the member H, outwardly from the position where it is engaged by the members N. The body M is preferably defined by first and second segments 14 and 16, respectively, as best seen in FIGURES 3, 4 and 5, which have flat transverse faces 14a and 16a that are in abutting contact.

A number of circumferentially spaced tapped bores 18 are formed in the first segment 14 that are in longitudinal alignment with tapped recesses 20 formed in the second segment 16. A number of Allen head cap screws 21 extend through the bores 18 to engage the tapped recesses 20, and removably hold first and second segments 14 and 16 together to define the body M. Segments 14 and 16 are so recessed on the abutting faces 14a and 16a thereof that when the segments are in abutting contact the recesses cooperatively define a number of circumferentially spaced, radially extending bores 22, each of which is in communication with a separate confined space 24. On the adjacent faces 14a and 16a of the first and second segments 14 and 16, respectively, recesses are formed that cooperatively define a second centrally disposed confined space 26 which is cylindrical.

A centrally positioned cylindrical boss 28 extends outwardly from segment 14, as shown in FIGURE 3, which boss is in communication with the second confined space 26. A ring-shaped body shoulder 32 is formed in the interior portion of the body M at the junction of the second confined space 26 and a bore 30 that extends longitudinally through boss 28. A cylindrical bearing 34 is situated within the confines of the bore 30 in boss 28, with the bearing rotatably engaging an enlarged cylindrical end portion 36 of the spindle L. The body M is removably held in a rotatable position on the bearing 34 by a washer 38 disposed on the left-hand end of the spindle portion 36, as shown in FIGURE 3, with the washer being of such diameter as to abut against the body shoulder 32. A bolt 40 extends through washer 38 and threadedly engages a tapped recess 42 formed in the spindle portion 36, as shown in FIGURE 3.

The portion 10 of the spindle L is adapted to be removably positioned on the tail stock E (FIGURE 1), and when so positioned, rotatably supports the body M a fixed longitudinal distance from the tail stock E. Threads 44 are formed on the exterior surface of members N, with the transverse cross section of these members being such as to be snugly but slidably supported in the bores 22. A longitudinal slot 46 is formed in each of the members N, and each slot engages one of a number of pins 48 supported from the outer interior part of the first segment 14, as best illustrated in FIGURES 3 and 5.

A ring 50 is disposed in each confined space 24 and teeth 52 are formed on the external periphery thereof, as well as teeth 54 formed on the interior surface of each ring that engage threads 44 on the member N which extends into that particular confined space. The members N preferably have threads 53 formed on the interior surface thereof that engage threads 55 on the shanks 57 of bolts 59. The bolts 59 may be radially adjusted to bring the heads 56 of bolts 59 into proximity with the interior surface 12 of tubular member H of various sizes. if desired, the heads 56 may be formed on the outer extremities of the members N, and radial adjustment of the members N made by use of the wrench engageable heads only. A worm gear 60 is disposed in each of the confined spaces 24, and a first portion 62 is provided on each worm gear and is journalled in a recess formed in the second portion 16. Each worm gear 60 engages the teeth 52 of the ring 50 associated therewith. A shaft 66 is connected to each worm gear 60. Each shaft 66 projects through and is rotatably supported in one of a number of bores 68 formed in the first segment 14. A number of wrench-engageable heads 70 are provided, each of which is mounted on the outer extremity of one of the shafts 66 by a pin 72 or other suitable fastening means.

In use, operation of the invention is extremely simple. The structure A is mounted on the head stock D (FIGURE 1), and the second end portion 74 of each tubular member H extends to the right therebeyond. Each of the wrench-engageable heads 70 may be rotated to radially move the members N to such distances as required to permit the heads 56 to pressure contact the interior surface 58 of the tubular member H, and when so disposed, support the tubular member in a position in which it rotates on the longitudinal axis P. Such rotation, of course, is effected by rotation of the face plate F and the jaws G that grip the first end 76 of the tubular member H. When the wrench-engageable heads 70 are rotated, the worm gears 60 are likewise rotated, and rotate the toothed rings 50. The rings 50 rotate relative to the threaded members N and radially move the threaded members N inwardly or outwardly with reference to the body M, depending upon the direction of rotation of the heads 70.

Rotation of the members N relative to the body M is prevented by the pins 48 that slidably engage the slots 46. When it is desired to disengage the tail stock structure A from tubular member H, the operation just described is simply reversed. It will be apparent that when the tail stock structure A engages the interior surface of the tubular member H, as shown in FIGURES 1 and 3, mechanical work can be performed on the interior surface of the tubular member to the right of the structure A, as illustrated in FIGURE 3. Such mechanical work would involve cutting of circumferential recesses and the like. When the right-hand end of the tubular member H rotates about the longitudinal axis P of the bore 11 extending longitudinally through the tubular member H, the mechanical work performed on the interior surface of the tubular member, such as cutting grooves in the interior surface, will be truly concentric relative to the longitudinal axis P.

The bolts 59 are of such length as to permit the heads 56 to pressure contact the interior surface of pipe or tubing having an internal diameter of from 6 to 12 inches. It will, of course, be apparent that the tail stock structure may be made of a larger size if desired. The tubular member H when supported by the tail stock structure above described is trued up in the lathe, and in this position may have either the exterior surface or the end interior surface thereof machined.

I claim:

1. In combination with a lathe having a bed, a head stock, a power-driven rotatable face plate supported from said head stock, jaws on said face plate for engaging a first end of a tubular member, and a tail stock, a tail stock structure including:
   (a) a spindle removably supported from said tail stock structure and extending towards said face plate in longitudinal alignment with the center of rotation thereof;
   (b) a rigid body rotatably supported on said spindle, said body having a plurality of circumferentially spaced, radially positioned bores that extend inwardly from the periphery thereof to a plurality of first confined spaces in the interior of said body;
   (c) a plurality of elongate threaded members slidably supported in said bores and projecting outwardly therefrom, in each of which members a longitudinal slot is formed;
   (d) first means supported from said body for slidably engaging said slots to prevent rotation of said members relative to said body;
   (e) a plurality of externally gear toothed and internally threaded rings disposed in said confined spaces and journalled in said body that threadedly engage said threaded members;
   (f) a plurality of worm gears disposed in said confined spaces and journalled in said body with each of said worm gears engaging the gear teeth of one of said rings; and
   (g) second means for individually rotating each of said worm gears and ring associated therewith to move each of said threaded members radially to pressure contact the interior surface of said tubular member inwardly from a second end thereof and so position said second end that said tubular member rotates on the longitudinal axis of a bore extending therethrough.

2. A tail stock structure as defined in claim 1 wherein said body is defined by:
(h) first and second segments of substantially the same transverse cross section, the adjacent faces of which are in abutting contact, with said faces being so recessed as to define said bores and first confined spaces when said first and second segments are in said abutting contact; and
(i) third means for removably holding said first and second segments in said abutting contact.

3. A tail stock structure as defined in claim 2 wherein said spindle has an enlarged cylindrical portion on that end thereof most adjacent to said face plate, which first segment further includes:
(i) a tubular boss that extends from the center of said first segment towards said tail stock;
(j) a cylindrical bearing in said boss that rotatably engages said cylindrical portion; and
(k) fourth means for removably maintaining said bearing on said cylindrical portion.

4. A tail stock structure as defined in claim 3 wherein said fourth means comprises:
(l) a washer disposed in a second confined space defined by said first and second segments that is in communication with the interior of said bearing, said washer of sufficient diameter as to abut against an interior surface of said first segment that partially defines said first segment; and
(m) a cap screw that extends through said washer to engage a tapped recess formed in said enlarged cylindrical portion.

5. A tail stock structure as defined in claim 2 wherein said first means comprise a plurality of pins mounted on the abutting face of said first segment that project into said grooves.

6. A tail stock structure as defined in claim 2 wherein said second means comprise shafts connected to said worm gears, which shafts project through bores formed in said first segment in a direction away from said head stock.

7. A tail stock structure as defined in claim 6 which further includes:
(j) a plurality of wrench-engageable heads affixed to projecting ends of said shafts.

8. A tail stock structure as defined in claim 1 which further includes:
(h) a plurality of heads on the outer ends of said threaded members for pressure contacting the interior surface of said tubular member.

9. A tail stock structure as defined in claim 1 wherein said elongate members have tapped longitudinally extending bores therein, and said tail stock structure further including:
(h) a plurality of bolts having heads and threaded shanks, with said shanks threadedly engaging said tapped bores to permit said heads to be placed in proximity with the interior surfaces of tubular members of various internal diameters by rotation of said bolts in an appropriate direction.

References Cited
UNITED STATES PATENTS 2,501,684 3/1950 Landreth _____ 82—33
3,010,728 11/1961 Jennings _____ 279—2

LEONIDAS VLACHOS, *Primary Examiner.*

U.S. Cl. X.R.
82—45; 279—2